(12) United States Patent
Satokata

(10) Patent No.: US 8,581,868 B2
(45) Date of Patent: Nov. 12, 2013

(54) MOBILE INFORMATION TERMINAL

(75) Inventor: Naoto Satokata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 217 days.

(21) Appl. No.: 13/125,944

(22) PCT Filed: Oct. 26, 2009

(86) PCT No.: PCT/JP2009/068330
§ 371 (c)(1),
(2), (4) Date: May 19, 2011

(87) PCT Pub. No.: WO2010/050431
PCT Pub. Date: May 6, 2010

(65) Prior Publication Data
US 2011/0221683 A1    Sep. 15, 2011

(30) Foreign Application Priority Data
Oct. 27, 2008    (JP) .................................. 2008-275146

(51) Int. Cl.
*G06F 3/048* (2013.01)
(52) U.S. Cl.
USPC ........... 345/173; 345/174; 345/175; 345/176; 345/177; 455/566
(58) Field of Classification Search
None
See application file for complete search history.

(56) References Cited

U.S. PATENT DOCUMENTS

| 2003/0064688 A1 | 4/2003 | Mizuta et al. |
| 2007/0073692 A1 | 3/2007 | Nishimura et al. |
| 2009/0061947 A1* | 3/2009 | Park et al. ..................... 455/566 |

FOREIGN PATENT DOCUMENTS

| JP | 2000-112657 A | 4/2000 |
| JP | 2003-179678 A | 6/2003 |
| JP | 2007-94910 A | 4/2007 |

OTHER PUBLICATIONS

International Search Report, PCT/JP2009/068330, Feb. 16, 2010.
English translation of Concise Explanation of JP-2000-112657, Apr. 21, 2000.

\* cited by examiner

*Primary Examiner* — Joseph Haley
(74) *Attorney, Agent, or Firm* — Birch, Stewart, Kolasch & Birch, LLP

(57) ABSTRACT

To prevent a function assigned to a selection item from being performed by an erroneous operation at the time when both housings are expanded or housed.
A mobile information terminal that includes: an operation housing 3 having an operation panel 3*a* on which a plurality of operation keys 3*b* are arrayed; a display housing 2 having a display panel 2*a* on which a plurality of selection items are displayed and a touch operation on any of the selection items is performed; and a connecting mechanism connecting the operation housing 3 and the display housing 2 to each other, and can make the transition between an open state where the operation panel 3*a* is exposed and a close state where the operation panel 3*a* is housed is configured to include: a touch panel 11 that detects the operation start and end of the touch operation; a selection item selecting part 12 that, on the basis of a result of the detection of the operation start, selects the selection item; a state transition detecting part 17 that detects a state transition between the open state and the close state; and a function performing part 14 that performs a function preliminarily assigned to the currently selected selection item on the basis of a result of the detection of the operation end and a result of the detection of the state transition.

4 Claims, 5 Drawing Sheets

MOBILE INFORMATION TERMINAL

TECHNICAL FIELD

The present invention relates to a mobile information terminal, and more particularly, to improvement of a mobile information terminal that has an operation panel on which a plurality of operation keys are arrayed and a display panel on which a plurality of selection items are displayed and a touch operation on any of the selection items is performed.

BACKGROUND ART

A cellular phone provided with a touch panel of which a display surface is touched with a finger to be thereby able to operate a selection item on a menu screen or scroll the menu screen has been know. In the cellular phone provided with such a touch panel, a selection item displayed on the menu screen is directly "touched" to be thereby able to select the selection item, or perform a function assigned to the selection item.

However, in the case of a mobile information terminal in which an operation housing having an operation panel and a display housing having a display panel on which a touch operation is performed are connected to each other, there is a problem that, when the both housings are expanded or housed, the display panel is erroneously operated. Further, there is also a problem that, in an open state where the operation panel is exposed, when an operation key on the operation panel is operated, depending on a way for a user to hold the terminal, the display panel is erroneously operated.

In addition, Patent literature 1 discloses a technique that changes, depending on an operating state, a key event that is preferentially performed when a plurality of operation keys are simultaneously operated. However, an information processor described in Patent literature 1 cannot prevent a function assigned to a selection item from being performed by an erroneous operation of a display panel at the time when an operation housing and a display housing are expanded or housed.

Patent literature 1; JP 2007-94910A

DISCLOSURE OF THE INVENTION

Problem to be Solved by the Invention

The present invention is made in consideration of the above situations, and has an object to improve operability of a mobile information terminal having: an operation panel on which a plurality of operation keys are arrayed; and a display panel on which a touch operation on a currently displayed selection item is performed. In particular, the present invention has an object to provide a mobile information terminal that can suppress a function assigned to a selection item from being performed by an erroneous operation at the time when both housings are expanded or housed. Also, the present invention has an object to provide a mobile information terminal that, when an operation key is operated in an open state where the operation panel is exposed, detects an unintended touch operation by a user to thereby prevent an operation by the operation key from being blocked.

Means Adapted to Solve Problems

A mobile information terminal according to a first aspect of the present invention is a mobile information terminal that includes: an operation housing having an operation panel on which two or more operation keys are arrayed; a display housing having a display panel on which two or more selection items are displayed and a touch operation on any of the selection items is performed; and a connecting mechanism connecting the operation housing and the display housing to each other, and can make a transition between an open state where the operation panel is exposed and a close state where the operation panel is housed, and configured to include: touch operation detecting means adapted to detect an operation start and an operation end of the touch operation; selection item selecting means adapted to, on the basis of a result of the detection of the operation start, select the selection item; state transition detecting means adapted to detect a state transition between the open state and the close state; and function performing means adapted to perform a function preliminarily assigned to the currently selected selection item on a basis of a result of the detection of the operation end and a result of the detection of the state transition.

In the mobile information terminal, on the basis of the detection result of the operation start of the touch operation, the selection item is selected, and on the basis of the detection result of the operation end and the detection result of the state transition, the function preliminarily assigned to the currently selected selection item is performed. Based on such a configuration, if during the touch operation, the state transition between the open state and the close state is detected, the touch operation can be made to be ignored, and therefore the function assigned to the selection item can be suppressed from being performed by an erroneous operation at the time when the both housings are expanded or housed.

A mobile information terminal according to a second aspect of the present invention is configured such that, in addition to the above configuration, the connecting mechanism is a sliding mechanism that, with a surface on a side of the operation panel of the operation housing and a surface on a side opposite to the display panel of the display housing facing to each other, relatively moves the operation housing and the display housing. According to such a configuration, the function assigned to the selection item can be suppressed from being performed by an erroneous operation at the time when the both housings are expanded from the close state to the open state, or housed from the open state to the close state only by a hand holding the terminal.

A mobile information terminal according to a third aspect of the present invention is configured to, in addition to the above configuration, include informing means adapted to, if during the touch operation, the state transition is detected, on the basis of a result of the detection of the state transition, inform that the touch operation has been disabled. According to such a configuration, if during the touch operation, the both housings are expanded from the close state, or housed from the open state, it is informed that the touch operation has been disabled, and therefore a user can be aware of having erroneously operated the display panel.

A mobile information terminal according to a fourth aspect of the present invention is a mobile information terminal that has an operation panel on which two or more operation keys are arrayed and a display panel on which two or more selection items are displayed and a touch operation on any of the selection items is performed, and configured to include: touch operation detecting means adapted to detect an operation start and an operation end of the touch operation; selection item selecting means adapted to, on the basis of a result of the detection of the operation start, select the selection item; key input signal generating means adapted to, on the basis of an operation of any of the operation keys, generate a key input signal; and function performing means adapted to perform a function preliminarily assigned to the currently selected selection item on the basis of a result of the detection of the operation end and the key input signal.

In the mobile information terminal, on the basis of the detection result of the operation start of the touch operation, the selection item is selected, and on the basis of the detection result of the operation end and the key input signal, the function preliminarily assigned to the currently selected selection item is performed. Based on such a configuration, if during the touch operation, any of the operation keys is operated, the touch operation can be made to be ignored, and therefore a function assigned to a selection item can be suppressed from being performed by an unintended touch operation by a user during an operation of some operation key in the open state where the operation panel is exposed.

A mobile information terminal according to a fifth aspect of the present invention is configured to, in addition to the above configuration, include informing means adapted to, if during the touch operation, any of the operation keys is operated, on a basis of the key input signal generated by the operation of the operation key, inform that the touch operation has been disabled. According to such a configuration, if during the touch operation, any of the operation keys is operated, it is informed that the touch operation has been disabled, and therefore a user can be aware of having erroneously operated the display panel.

Effects of the Invention

According to the mobile information terminal according to the present invention, if during a touch operation, the state transition is detected, the touch operation can be made to be ignored, and therefore a function assigned to a selection item can be suppressed from being performed by an erroneous operation at the time when the both housings are expanded or housed. Also, if during a touch operation, any of the operation keys is operated, the touch operation can be made to be ignored, and therefore a function assigned to a selection item can be suppressed from being performed by an erroneous operation at the time of an operation of an operation key in the open state where the operation panel is exposed. Accordingly, operability of a mobile information terminal having an operation panel on which a plurality of operation keys are arrayed and a display panel on which a touch operation on any of currently displayed selection items is performed can be improved.

BEST MODE FOR CARRYING OUT THE INVENTION

FIGS. 1(a) and (b) are diagrams illustrating an example of a schematic configuration of a mobile information terminal according to an embodiment of the present invention, in which as an example of the mobile information terminal, a slide type cellular phone 1 is illustrated. FIG. 1(a) is a front view, and FIG. 1(b) is a side view. The cellular phone 1 includes: a thin type display housing 2 having a display panel 2a; a thin type operation housing 3 having an operation panel 3a; and a sliding mechanism (not illustrated) that slidably connects the display housing 2 and the operation housing 3 to each other.

The display panel 2a is formed on one main surface of the display housing 2, and configured to be a touch panel of which a panel surface is touched with a finger to be thereby able to operate a selection item displayed on the panel surface or scroll the screen. It is assumed here that the display panel 2a has a vertically long rectangular-shaped display area, and a plurality of selection items are displayed in the display area. As the selection items, for example, icons each formed into an encoded figure or pictogram are displayed.

The touch panel is touch operation detecting means adapted to detect a touch operation on the basis of a variation in electrostatic capacitance occurring when a finger is brought close to the touch panel.

The operation panel 3a is formed on one main surface of the operation housing 3, on which a plurality of operation keys 3b are arrayed. The operation keys 3b on the operation panel 3a are input devices each including a switch of a contact switching type. Here, an arrow key for inputting a direction, an enter key (decision key), a guide key, a ten key, an on-hook key, an off-hook key, and the like are provided as the operation keys 3b.

The display housing 2 and the operation housing 3 are respectively formed into vertically long rectangular parallelepiped shapes, and connected with main surfaces thereof facing to each other. Specifically, they are connected with a main surface on a side opposite to the display panel 2a of the display housing 2 and the main surface on a side of the operation panel 3a of the operation housing 3 facing to each other.

The sliding mechanism serves as a connecting mechanism that relatively moves the display housing 2 and operation housing 3 in one direction with the main surface on the side opposite to the display panel 2a of the display housing 2 and the main surface on the operation panel 3a side of the operation housing 3 facing to each other. In this embodiment, the both housings are slidable in their longer direction, i.e., in the vertical direction, and the transition between an open state (expanded state) where the both housings are expanded to expose the operation panel 3a and a close state (housed state) where the display housing 2 is slid on the operation housing 3 side to house the operation panel 3a can be made.

In the cellular phone 1, the plurality of selection items are displayed on the display panel 2a, and operation of detecting a touch operation on any of the selection items to perform a function assigned to the selection item is performed. Also, if, during the touch operation, the state transition between the open state and the close state is detected, or any of the operation keys 3b is operated, operation of canceling the touch operation is performed.

FIGS. 2(a) and (b) are perspective views illustrating a configuration example of the cellular phone 1 in FIG. 1, in which the cellular phone 1 having a magnet 4 and magnetic sensor 5 for detecting the state transition, which are disposed in the housings, is illustrated. FIG. 2(a) illustrates the open state where the both housings are expanded, and FIG. 2(b) illustrates the close state where the both housings are housed.

The magnetic sensor 5 is detecting means adapted to detect the state transition between the open state and the close state. It is assumed here that the magnetic sensor 5 is configured to include a Hall IC containing, in one chip, a Hall element that uses the Hall effect to detect a variation in magnetic field due to sliding of the housings, and a conversion circuit that converts a signal of the detection to a digital signal to output it.

The magnetic sensor 5 is arranged in an end part in the longer direction of the operation housing 3, and the magnet 4 is arranged in an end part in the longer direction of the display housing 2. In the open state, a distance between the magnet 4 and the magnetic sensor 5 is maximized, whereas in the close state, the magnet 4 and the magnetic sensor 5 come close to a position where they face to each other, and the distance between the magnet 4 and the magnetic sensor 5 is minimized.

That is, a magnetic field generated toward a surrounding space by the magnet 4 largely varies, as viewed from the magnetic sensor 5, depending on whether the terminal is in the open state or the close state. By making the magnetic sensor 5 detect such a variation in magnetic field, the state transition between the open state and the close state can be detected.

FIG. 3 is a block diagram illustrating the configuration example of the cellular phone 1 in FIG. 1, in which an example of a functional configuration inside the cellular phone 1 is illustrated. The cellular phone 1 is configured to include a touch panel 11, a selection item selecting part 12, an LCD 13, a function performing part 14, a key input signal generating part 15, a menu screen displaying part 16, a state transition detecting part 17, and an informing part 18.

The touch panel 11 is touch operation detecting means adapted to sense a touch operation on the display panel 2a with use of a phenomenon in which an electrostatic capacitance between electrodes is varied by a user operation, and detect the operation start and end of the touch operation. Specifically, timing of the operation start of the touch operation, and a position on the display panel 2 at the time of the operation start; and timing of the operation end, and a position on the display panel 2a at the time of the operation end are detected.

The menu screen displaying part 16 performs operation of controlling the LCD (Liquid Crystal Display) 13 to display, in the display area of the display panel 2a, for example, a menu screen on which the plurality of selection items are arrayed.

The key input signal generating part 15 performs operation of, when a user operate any of the operation keys 3b on the operation panel 3a, on the basis of the operation of the operation key, generating a predetermined key input signal.

The state transition detecting part 17 performs operation of, on the basis of output from the magnetic sensor 5, detecting the state transition between the open state and the close state.

The selection item selecting part 12 performs operation of, on the basis of a result of the detection of the operation start by the touch panel 11, selecting any of the selection items on the menu screen to display it in focus. Specifically, a selection item displayed at an operational position on the display panel 2a at the time of the operation start of the touch operation is selected.

Note that the operational position on the display panel 2a refers to a contact position at the time when a finger is brought into contact with the touch panel 11, and if the operational position changes with keeping the contact state, it is determined that the operational position moves. It is assumed that the contact state here includes not only the case where the finger and the touch panel 11 actually come into abutting contact with each other, but the case the finger is slightly apart from the touch panel 11.

A selection item selected by the selection item selecting part 12 is displayed in focus in a predetermined display mode different from a mode of selection items in a nonselective state. For example, the selection item displayed in focus is different from the selection items in the nonselective state in a background color of a character string, a size of the selection item, a shape, a display color of the selection item, a character size, a font, a character color, and the like.

The function performing part 14 performs operation of performing a function preliminarily assigned to a currently selected selection item on the basis of a result of the detection of the operation end by the touch panel 11 and a result of the detection of the state transition by the state transition detecting part 17. Specifically, if the operation end of the touch operation is detected when any of the selection items is selected, operation of performing a function assigned to the currently selected selection item is performed. For example, operation of switching an operational object to a screen preliminarily linked to a selection item currently displayed in focus is performed.

On the other hand, if when any of the selection items is selected, the state transition from the open state to the close state, or from the close state to the open state is detected, operation of: determining that an erroneous operation is performed; generating a predetermined error signal; and ignoring the operation end of the touch operation is performed. That is, if the state transition is detected during the touch operation, a function assigned to a selection item is not performed even if the operation end of the touch operation is subsequently detected.

The informing part 18 performs operation of, when the state transition is detected during the touch operation, informing that the touch operation is disabled on the basis of the detection result of the state transition. For example, a message indicating that the touch operation has been cancelled is displayed on the display panel 2a.

In the selection item selecting part 12, operation of, on the basis of a key input signal from the key input signal generating part 15, selecting a selection item to display it in focus is also performed. That is, by operating the arrow key or ten key on the operation panel 3a, a selection item on the menu screen can also be selected.

In the function performing part 14, operation of, on the basis of a key input signal from the key input signal generating part 15, performing a function assigned to a currently selected selection item is performed. For example, by operating the enter key on the operation panel 3a, a function assigned to a currently selected selection item can be performed.

In the function performing part 14, operation of, on the basis of a result of the detection of the operation end of the touch operation and a key input signal, performing a function assigned to a currently selected selection item is performed. Specifically, if any of the operation keys 3b is operated in the state where any of the selection items is selected by the touch operation on the display panel 2a, operation of: determining that the display panel 2a has been erroneously operated; generating the predetermined error signal; and ignoring the operation end of the touch operation is performed. That is, if any of the operation keys 3b is operated during the touch operation, key input by the operation of the operating key 3b is given priority, and then even if the operation end of the touch operation is detected, a function assigned to a selection item is not performed.

If during the touch operation, the state transition is detected, or any of the operation keys 3b is operated, for example, the selective state of a selection item is cancelled.

In the informing part 18, if any of the operation keys 3b is operated during the touch operation, operation of informing that the touch operation has been disabled on the basis of a key input signal by the operation of the operation key is performed.

Steps S101 to S107 in FIG. 4 represent a flowchart illustrating an example of operation of the cellular phone 1 in FIG. 1. First, when the touch operation is detected by the touch panel 11, the selection item selecting part 12 selects, on the basis of the detection result of the operation start of the touch operation, a selection item on the menu screen to display it in focus (Steps S101 and S102).

Then, when the touch operation is completed, the function performing part 14 performs, on the basis of the detection result of the operation end of the touch operation, a function assigned to the currently selected selection item (Steps S103 and S104).

On the other hand, if during a period during which any of the selection items is selected by the touch operation and displayed in focus, the housings are slid and the state transition is detected, the function performing part 14 generates the error signal to ignore the touch operation (Steps S103 and S105). At this time, the selective state of the selection item is cancelled, and it is informed that the touch operation has been disables (Steps S106 and S107).

According to the present embodiment, if during the touch operation, the state transition between the open state and the close state is detected, the touch operation can be made to be ignored, and therefore a function assigned to a selection item can be prevented from being performed by an erroneous operation at the time when the both housings are expanded or housed. Further, if during the touch operation, the both housings are expanded from the close state, or housed from the open state, it is informed that the touch operation has been disabled, and therefore a user can be aware of having erroneously operated the display panel 2a.

Also, if during the touch operation, any of the operation keys 3b is operated, the touch operation can be made to be ignored, and therefore a function assigned to a selection item can be prevented from being performed by an erroneous operation at the time of the operation of the operation key 3b in the open state. Further, if during the touch operation, any of the operation keys 3b on the operation panel 3a is operated, it is informed that the touch operation has been disabled, and therefore a user can be aware of having erroneously operated the display panel 2a.

Note that, in the present embodiment, the case where if during the touch operation on the display panel 2a, the state transition is detected, or key input by an operation of any of the operation keys 3b is provided, the touch operation is disabled, and the selective state of a selection item is cancelled is described as an example; however the present invention is not limited to this. For example, in the case where any of the selection items has already been selected before the touch operation, on the basis of a detection result of the state transition, or key input by an operation of any of the operation keys 3b during the touch operation, the selective state of the selection item having been selected immediately before the touch operation may be restored.

FIGS. 5(a) and (b) are transition diagrams respectively illustrating other operation examples of the mobile information terminal according to the embodiment of the present invention. FIG. 5(a) illustrates the case where by the sliding of the housings or key operation during the touch operation, the selective state of a selection item is cancelled. FIG. 5(b) illustrates the case where by the sliding of the housings or key operation during the touch operation, the selective state of a selection item having been selected immediately before the touch operation is restored.

In the examples, an operation of bringing a finger close to and into abutting contact with the touch panel 11 is referred to as a touch down (TD) operation, and an operation of moving the finger away from the state where the finger is in touch with the touch panel 11 is referred to as a touch up (TU) operation.

The menu screen in the diagrams is a selection screen for setting various types of functions of the terminal, on which a plurality of selection items are arrayed.

In the diagrams, four selection items assigned with the functions that are respectively indicated by character strings, i.e., "Silent mode setting", "Display setting", "Dress-up setting", and "Sound, vibration, and light setting", are arrayed.

In the case of FIG. 5(a), when the TD operation of, for example, the selection item "Dress-up setting" is performed, the selection item is selected and displayed in focus in a predetermined display mode A2. The currently selected selection item "Dress-up setting" is displayed in the display mode different from a display mode A1 of the selection items in a non-focus state. For example, in the case of the selection items in the non-focus state, character strings are displayed with white on black backgrounds, respectively, whereas in the case of the currently selected selection item, a character string is displayed with white on a blue background.

When in the state where the selection item "Dress-up setting" is selected, the TU operation is performed, the function assigned to the selection item is selectively performed, and then the operational object is switched to a newly displayed screen.

In contrast, if during the touch operation, the state transition due to the sliding of the housings is detected, or key input by an operation of any of the operation keys 3b is provided, the selective state of the selection item "Dress-up setting" is cancelled, and the touch operation is also cancelled.

On the other hand, in the case of FIG. 5(b), the selection item "Silent mode setting" has already been selected and displayed in focus in the display mode A2.

When in the state where the selection item "Silent mode setting" is selected, the TD operation of the selection item "Dress-up setting" is performed, the focus moves to the selection item "Dress-up setting". When in the state where the selection item "Dress-up setting" is selected, the TU operation is performed, the function assigned to the selection item is selectively performed, and then the operation object is switched to a newly displayed screen.

In contrast, if during the touch operation, the state transition due to the sliding of the housings is detected, or key input by an operation of any of the operation keys 3b is provided, the selective state of the selection item "Dress-up setting" is cancelled, and the touch operation is also cancelled. On the basis of the cancel of the touch operation, the selective state of the selection item "Silent mode setting" having been selected immediately before the touch operation is restored, and the focus moves to the selection item.

As described, on the basis of the state transition or the operation of any of the operation keys 3b during the touch operation, the selective state immediately before the touch operation may be restored.

Also, in the present embodiment, the case where the present invention is applied to the slide type cellular phone 1 of which the display housing 2 and the operation housing 3 are relatively slid in the one direction is described as an example; however, the present invention is not limited to this. For example, the present invention can also be applied to a flip type cellular phone of which a display housing and an operation housing can be folded by a hinge mechanism that connects the both housings to each other.

Further, in the present embodiment, the case where the informing part 18 informs a user that a touch operation has been disabled is described as an example; however, the present invention is not limited to this, and a configuration not provided with the informing part 18 is also included in the present invention.

This application claims priority under the Paris Convention based on the following patent application in Japan: the patent application filed on Oct. 27, 2008 (Japanese patent application No. 2008-275146), the entire content of which is incorporated herein by reference.

DESCRIPTION OF REFERENCE NUMERALS

Figure 1:
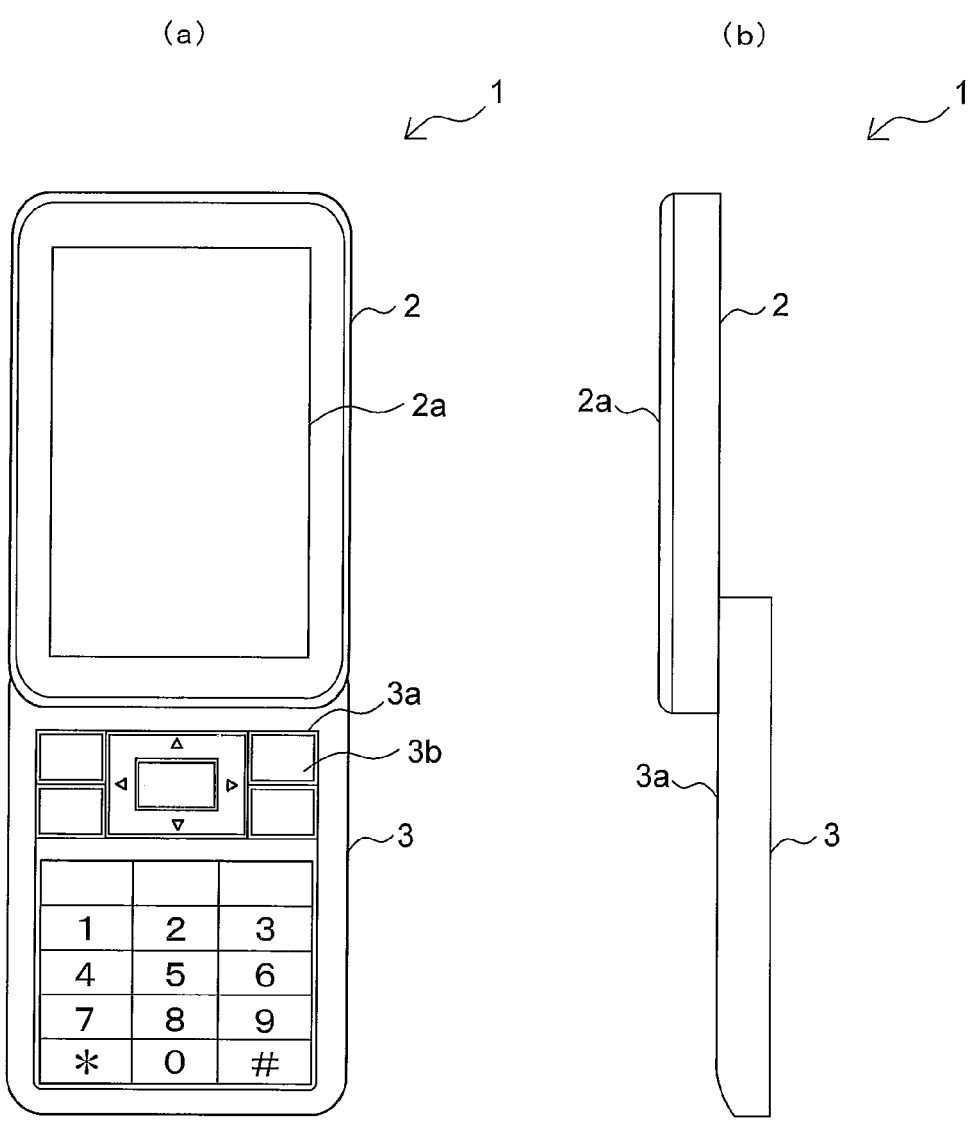
FIG. 1 is a diagram illustrating an example of a schematic configuration of a mobile information terminal according to an embodiment of the present invention, in which as an example of the mobile information terminal, a slide type cellular phone 1 is illustrated.
Figure 2:
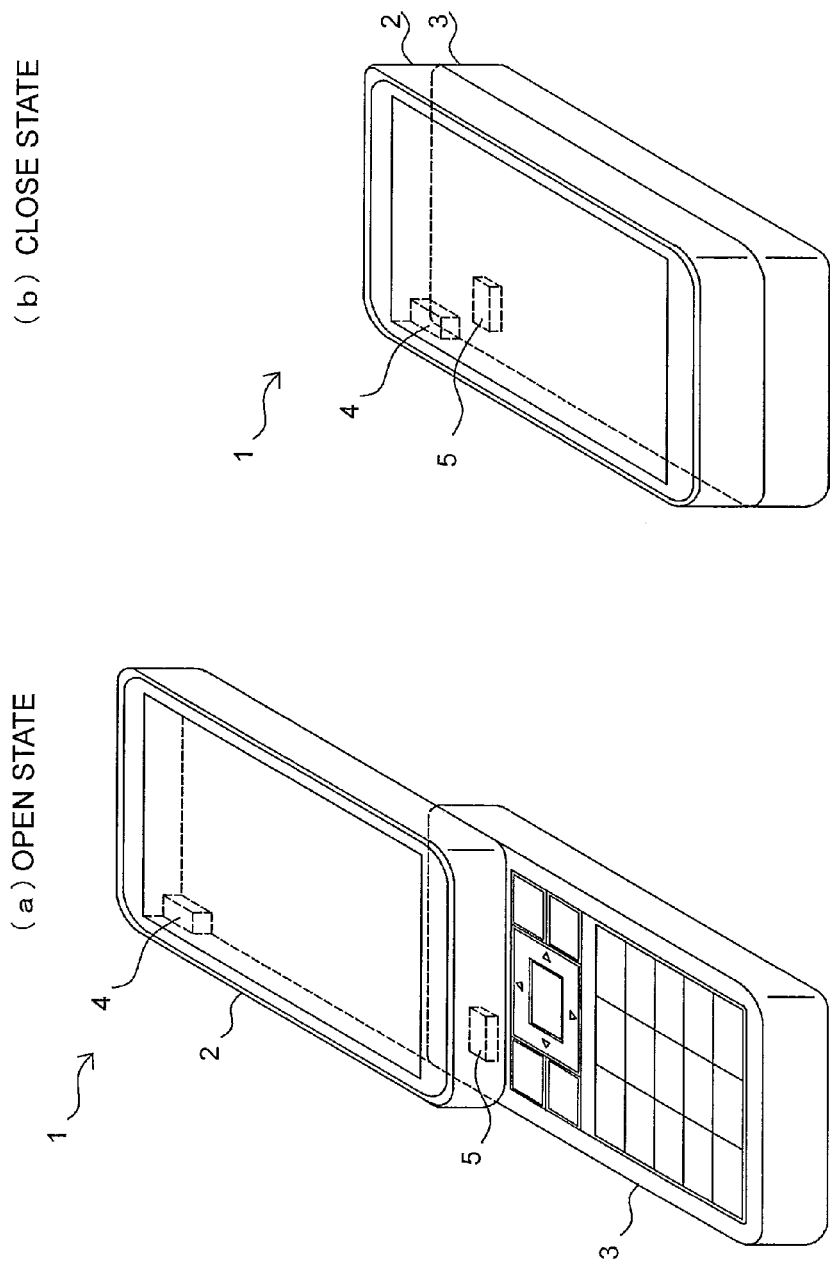
FIG. 2 is a perspective view illustrating a configuration example of the cellular phone 1 in FIG. 1, in which the cellular phone 1 in which a magnet 4 and a magnetic sensor 5 for detecting a state transition are disposed is illustrated.
Figure 3:
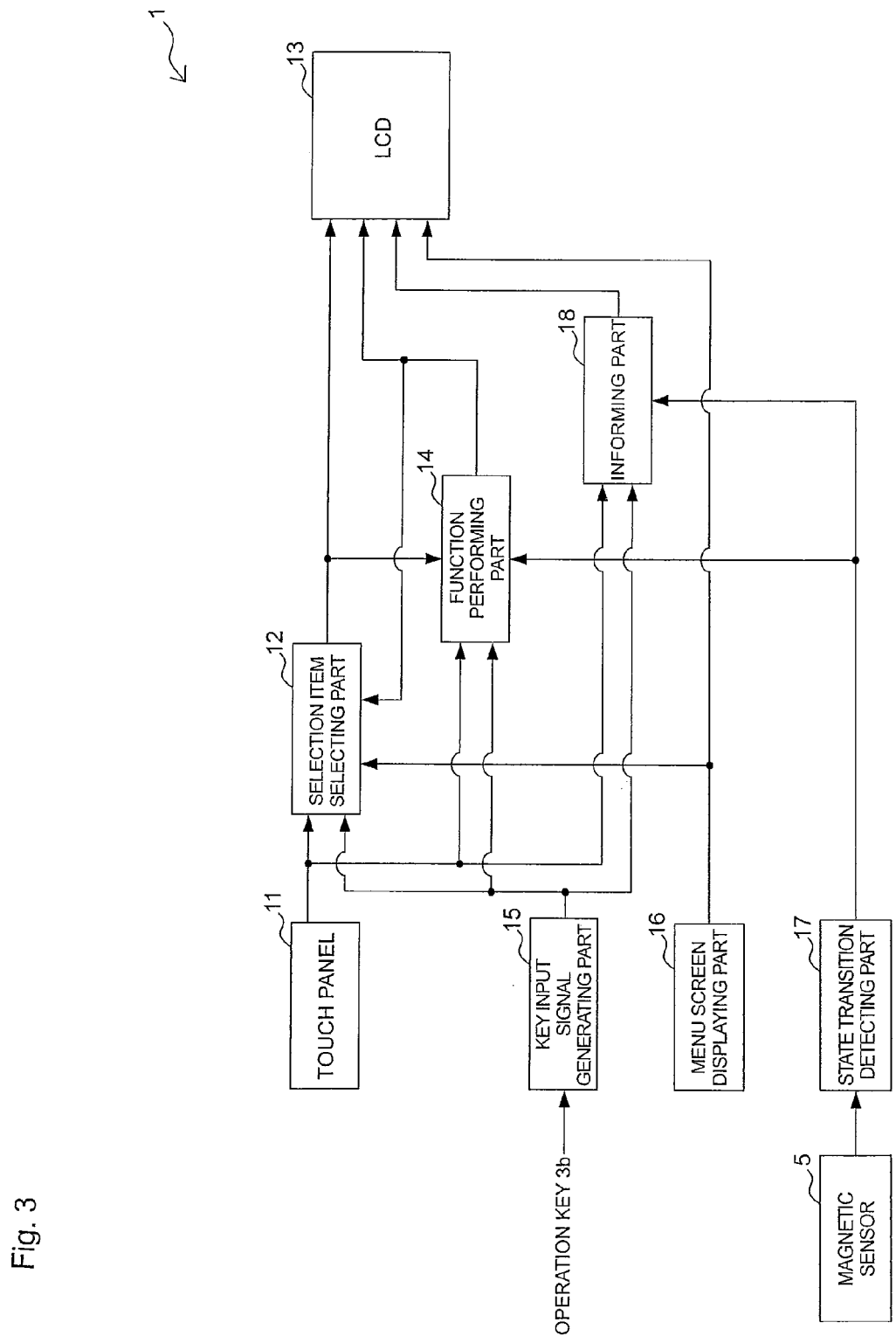
FIG. 3 is a block diagram illustrating the configuration example of the cellular phone 1 in FIG. 1, in which an example of a functional configuration inside the cellular phone 1 is illustrated.
Figure 4:
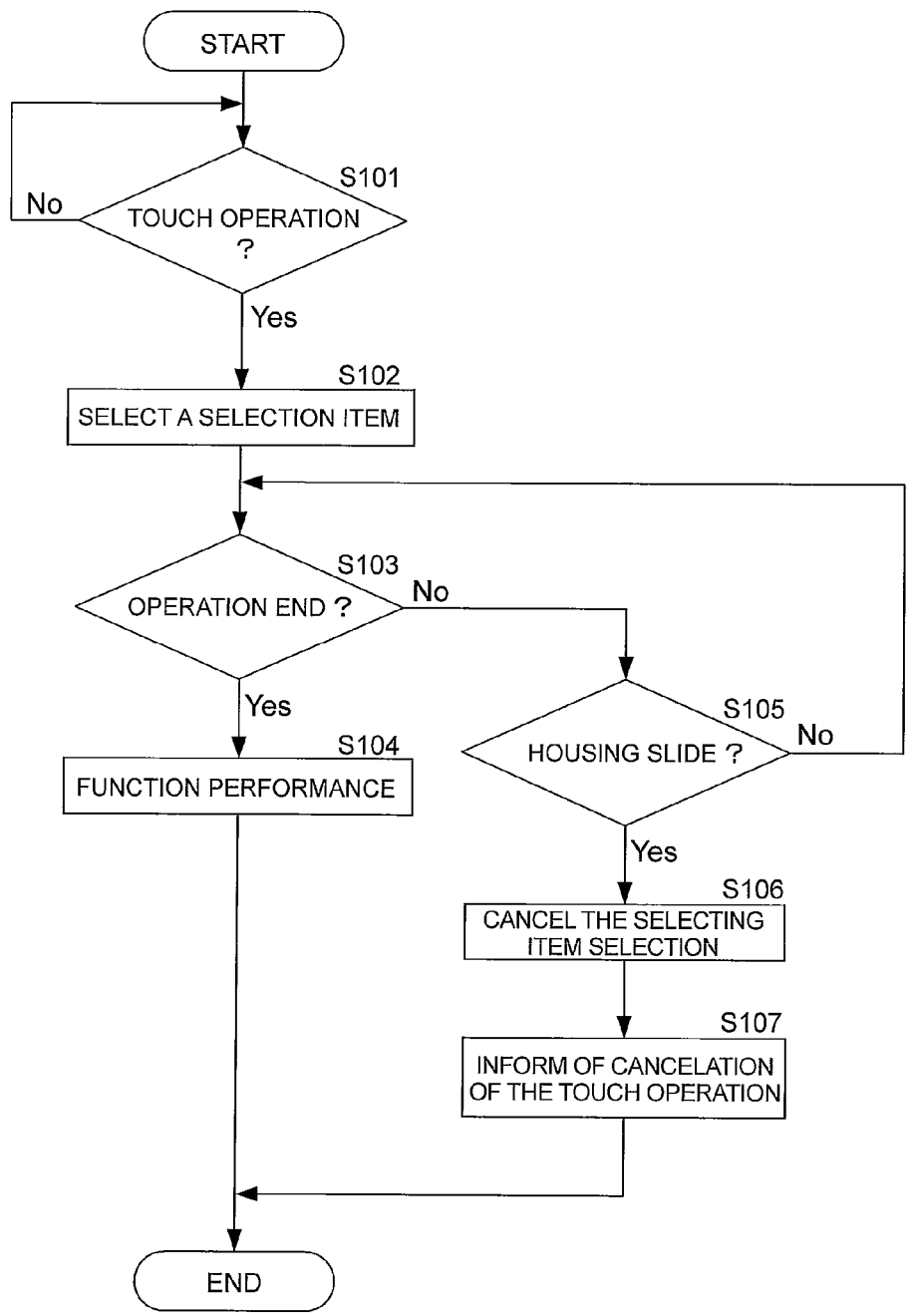
FIG. 4 is a flowchart illustrating an example of operation of the cellular phone 1 in FIG. 1.
Figure 5:
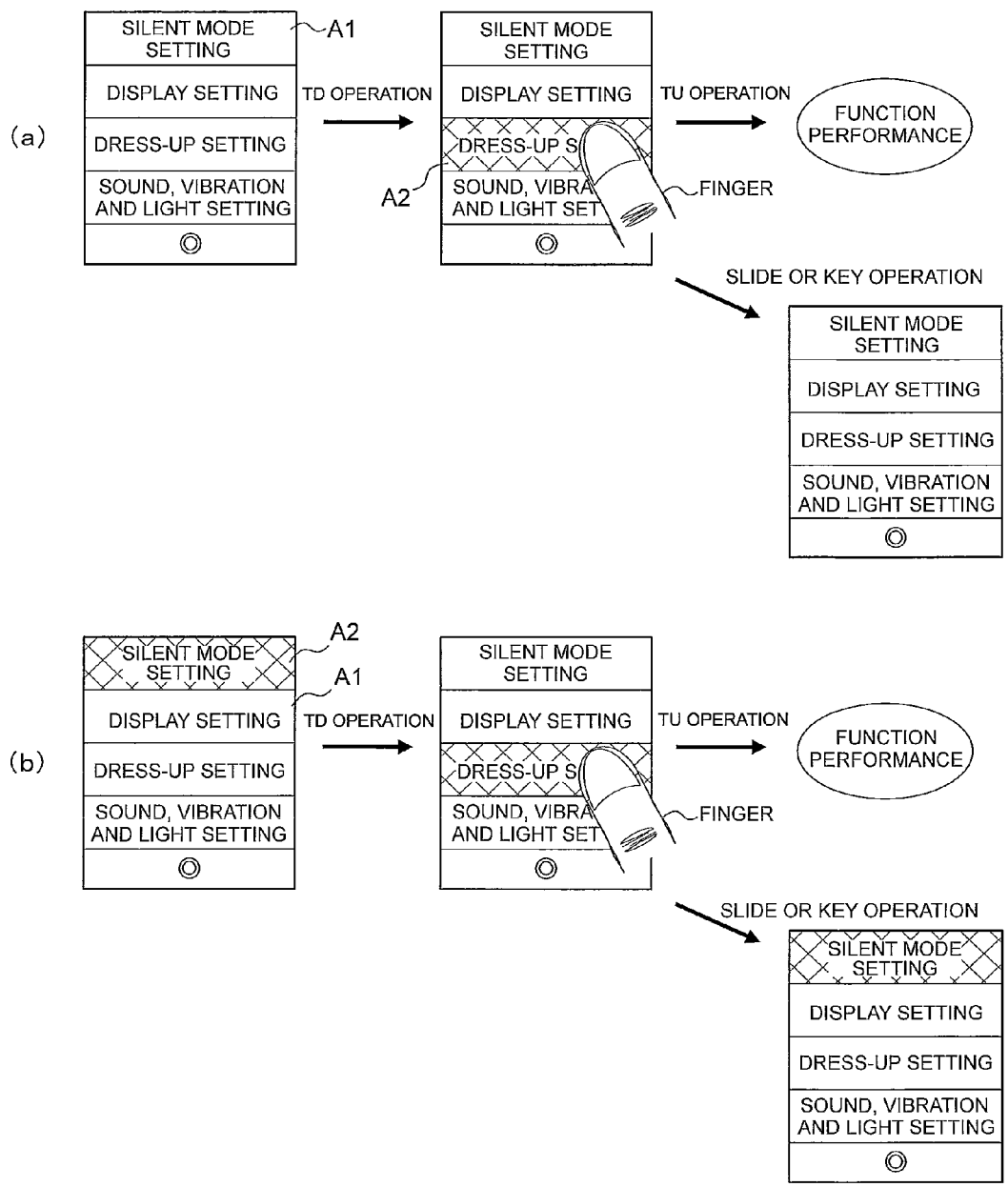
FIG. 5 is a transition diagram illustrating another operation example of the mobile information terminal according to the embodiment of the present invention.

1 Cellular phone
2 Display housing
2a Display panel
3 Operation housing
3a Operation panel
3b Operation key(s)
4 Magnet
5 Magnetic sensor
11 Touch panel
12 Selection item selecting part
13 LCD
14 Function performing part
15 Key input signal generating part
16 Menu screen displaying part
17 State transition detecting part
18 Informing part
A1 Display mode in a non-focus state
A2 Display mode in a focus state

The invention claimed is:

1. A mobile information terminal that has an operation panel on which two or more operation keys are arrayed and a touch panel on which two or more selection items are displayed, the mobile information terminal comprising:
a touch operation detector configured to detect an operation start and an operation end of the touch operation on any of the selection items;
a selector configured to, on a basis of a result of the detection of the operation start, select the selection item displayed by the touch panel;
a key input signal generator configured to, on a basis of an operation of any of the operation keys, generate a key input signal; and
a function performing part configured to perform a function preliminarily assigned to the currently selected selection item on a basis of a result of the detection of the operation end and the key input signal, wherein
if any of the operation keys is operated during the touch operation, said touch operation is disabled.

2. The mobile information terminal according to claim 1, further comprising an informing unit configured to inform a user that the touch operation has been disabled, in case that any of the operation keys has been operated during the touch operation.

3. A mobile information terminal that includes: an operation housing having an operation panel on which two or more operation keys are arrayed; a display housing having a touch panel on which two or more selection items are displayed; and a connecting mechanism connecting the operation housing and the display housing to each other, and can make a transition between an open state where the operation panel is exposed and a closed state where the operation panel is housed, the mobile information terminal comprising:
a focus display part configured to display in focus any one of said two or more selection items;
a touch operation detector configured to detect an operation start and an operation end of a touch operation on any of the selection items;
a focus shifting part configured to, on a basis of a result of the detection of the operation start, shift a target of the focus display from the selection item currently displayed in focus to the selection item subjected to the touch operation;
a state transition detector configured to detect a state transition between the open state and the closed state; and
a function performing part configured to perform a function preliminarily assigned to said selection item displayed in focus based on a result of the detection of the operation end, wherein
if the state transition between the open state and the closed state during said touch operation is detected, said focus shifting part shifts the target of the focus display back to the selection item displayed in focus before the operation start, without performing the function by said function performing part.

4. A mobile information terminal that has an operation panel on which two or more operation keys are arrayed and a touch panel on which two or more selection items are displayed, the mobile information terminal comprising:
a focus display part configured to display any one of said two or more selection items;
a touch operation detector configured to detect an operation start and an operation end of a touch operation on any of the selection items;
a focus shifting part configured to, on a basis of a result of the detection of the operation start, shift a target of the focus display from the selection item currently displayed in focus to the selection item subjected to the touch operation;
a key input signal generator configured to, on a basis of an operation of any of the operation keys, generate a key input signal; and
a function performing part configured to perform a function preliminarily assigned to said selection item displayed in focus based on a result of the detection of the operation end, wherein
if any of the operation keys is operated during said touch operation, said focus shifting part shifts the target of the focus display back to the selection item displayed in focus before the touch operation, without performing the function by said function performing part.

* * * * *